US006947751B2

(12) United States Patent
Ishikawa et al.

(10) Patent No.: US 6,947,751 B2
(45) Date of Patent: Sep. 20, 2005

(54) COMMUNICATION SYSTEM AND RESOURCE ASSIGNING METHOD THEREFOR

(75) Inventors: Yoshihiro Ishikawa, Yokosuka (JP); Seizo Onoe, Yokohama (JP); Takaaki Satoh, Yokosuka (JP); Takehiro Nakamura, Yokosuka (JP)

(73) Assignee: NTT DeCoMo, Inc., Tokyo (JP)

( * ) Notice: Subject to any disclaimer, the term of this patent is extended or adjusted under 35 U.S.C. 154(b) by 681 days.

(21) Appl. No.: 09/968,732

(22) Filed: Oct. 1, 2001

(65) Prior Publication Data

US 2002/0068579 A1 Jun. 6, 2002

(30) Foreign Application Priority Data

Oct. 2, 2000 (JP) ........................................ 2000-302733

(51) Int. Cl.[7] ................................................ H04Q 7/20
(52) U.S. Cl. .................... 455/453; 455/450; 455/452.1; 455/452.2; 455/464; 370/230
(58) Field of Search ......................... 455/67.11, 67.13, 455/423, 450, 445, 452.1, 452.2, 453, 424, 455, 464; 370/230, 235, 431, 437, 468, 329, 335, 337, 342, 347, 348, 395.41, 412, 441, 442, 447, 461, 479, 490, 902, 913; 709/226, 228, 240; 379/112.01

(56) References Cited

U.S. PATENT DOCUMENTS

| 4,272,650 A | * | 6/1981 | Bolgiano et al. | ........... 455/462 |
| 5,355,367 A | * | 10/1994 | Comroe et al. | ............. 370/329 |
| 5,666,356 A | | 9/1997 | Fleming et al. | ............. 370/328 |

(Continued)

FOREIGN PATENT DOCUMENTS

| EP | 0 889 663 A1 | 7/1999 | ............ H04Q/7/38 |
| EP | 1022920 A2 | 7/2000 | ............ H04Q/7/38 |
| EP | 1061762 A1 | 12/2000 | ............ H04Q/7/38 |
| JP | 11-041239 | 12/1999 | ............ H04L/12/28 |
| WO | WO97/13334 | 4/1997 | ............ H04B/7/216 |
| WO | WO98/30057 | 7/1998 | ............ H04Q/7/38 |
| WO | WO99/23842 | 5/1999 | ............ H04Q/7/20 |
| WO | WO 99/39535 | 8/1999 | ............ H04Q/7/38 |
| WO | WO00/01189 | 1/2000 | ............ H04Q/7/38 |
| WO | WO00/35235 | 6/2000 | ............ H04Q/7/38 |
| WO | WO00/49824 | 8/2000 | ............ H04Q/7/38 |

OTHER PUBLICATIONS

Leonard Kleinrock, "Queuing Systems Volume I: Theory" Professor Computer Science Department School of Engineering and Applied Science University of California, Los Angeles A Wiley–Interscience Publication John Wiley & Sons.

Leonard Kleinrock Queuing Systems Volume II: Computer Applications Professor Computer Science Department School of Engineering and Applied Science University of California, Los Angeles A Wiley–Interscience Publication John Wiley & Sons.

*Primary Examiner*—William Trost
*Assistant Examiner*—James D Ewart
(74) *Attorney, Agent, or Firm*—Workman Nydegger

(57) ABSTRACT

The present invention maintains the utilization of resources even in spite of the presence of a large number of communications each requiring a large amount of resources under multidimensional traffic conditions. First, the current traffic is measured. Then, a threshold value is determined on the basis of the amount of resources requested. Then, the current traffic is compared with the threshold value. If the measured traffic exceeds the threshold value, it is determined that the request cannot be accepted. In contrast, if the measured traffic is equal to or smaller than the threshold value, it is determined that the request can be accepted, and a process of accepting the resource request is executed to end the entire process.

100 Claims, 6 Drawing Sheets

U.S. PATENT DOCUMENTS

| | | | |
|---|---|---|---|
| 5,684,801 A * | 11/1997 | Amitay et al. | 370/447 |
| 5,751,712 A * | 5/1998 | Farwell et al. | 370/431 |
| 6,005,852 A * | 12/1999 | Kokko et al. | 370/329 |
| 6,266,330 B1 * | 7/2001 | Jokinen et al. | 370/329 |
| 6,327,472 B1 * | 12/2001 | Westroos et al. | 455/450 |
| 6,370,117 B1 * | 4/2002 | Koraitim et al. | 370/232 |
| 6,456,604 B1 * | 9/2002 | Lee et al. | 370/328 |
| 6,456,849 B1 * | 9/2002 | Purnadi et al. | 455/453 |
| 6,597,907 B1 * | 7/2003 | Pruitt et al. | 455/423 |
| 6,707,808 B1 * | 3/2004 | Vedrine | 370/337 |
| 6,721,568 B1 * | 4/2004 | Gustavsson et al. | 455/450 |

* cited by examiner

COMMUNICATION SYSTEM AND RESOURCE ASSIGNING METHOD THEREFOR

This application claims priority under 35 U.S.C. 119 to Patent Application No. 2000-302733 filed Oct. 2, 2000 in Japan, the content of which is incorporated hereinto by reference.

BACKGROUND OF THE INVENTION

1. Field of the Invention

The present invention relates to a communication system and a resource assigning method therefor, and more specifically, to a communication system for obtaining a resource for communication when a request therefor is issued and releasing the resource when the communication is over so that a plurality of communications can share the same resource and that the amount of resources required varies among the communications, as well as a resource assigning method that enables resources to be more efficiently shared in this communication system.

2. Description of the Related Art

Communication systems require various resources for communication; communication systems in which a large number of users communicate with one another require communication circuits in exchanges, relay cables, and a specified amount of radio circuits, and mobile communication systems in which users communicate with base stations while travelling require radio channels for use in communication between mobile and base stations. For each of these communication systems, system design must provide an amount of resources commensurate with the number of users.

Typically, since the probability that all the large number of users simultaneously make communication is assumed to be very low and negligible, it is unnecessary to provide sufficient resources to allow all these users to simultaneously make communication. If, however, requests for communication require an amount of resources exceeding a predetermined value, the system cannot accept these requests, that is, a call loss occurs. The system design typically determines the amount of resources so that the probability (call loss rate) that a call loss occurs is low and about 1 to several percents. Such system design is described, for example, in L. Kleinrock, "Queuing systems Volume I: Theory," John Willey & Sons, 1975 in detail, and description thereof is omitted.

Communications, which focused on sounds, have recently been diversified, and various aspects such as animated-image and data communications are emerging. Further, requests for communications have been diversified, and the amount of resources requested for communication is not always fixed; a varying amount of resources are requested. However, although individual small resources are constantly released and become free, they are unlikely to be combined into a large free resource. Accordingly, it is difficult to obtain free resources as required. Consequently, communication requiring a large amount of resources is likely to result in a call loss.

To solve these problems to maintain an impartial call loss rate, a method of providing a fixed amount of resources beforehand or the like is used. For example, Japanese Patent Application Publication No. 11-41239 "Method for Controlling Call Acceptances in Multidimensional Traffic" describes in detail an approach to obtaining an impartial call loss rate by using a simple method of avoiding accepting new resource requests if the number of resources in use exceeds a fixed threshold value.

Such system design is used for rapidly advancing mobile communication systems. In the mobile communication systems, a radio channel is used for communication between a mobile station and a base station. Typically, since a mobile communication system can use only limited radio bands, the amount of resources must be more strictly designed.

Radio access methods used for the mobile communication system include Frequency Division Multiple Access (FDMA), Time Division Multiple Access (TDMA), and Code Division Multiple Access (CDMA). In the FDMA and TDMA methods, the current traffic can be determined by counting the number of radio channels or time slots in use, and the design approach employed for fixed telephone networks as described previously is applicable to these methods.

On the other hand, with the CDMA method, the number of radio channels cannot be counted, but as described in WO98/30057 in detail, the traffic associated with a base station can be determined by measuring interference power at the base station or the total transmitted power therefrom. The conventional design approach or the multidimensional approach is applicable to the CDMA method.

In this manner, various system design approaches considering even multidimensional traffic or various traffic control approaches are conventionally applied to the various communication systems.

The conventional traffic control approaches, however, cannot avoid reducing the efficiency of resource sharing under multidimensional traffic conditions. In general, if the call loss rate is assumed to be fixed, the utilization of resources decreases with an increase in the amount of resources used for a single communication. This phenomenon is based on what is called the aggregation effect; the utilization of the resources increases consistently with the amount of available resources regardless of the amount of resources used for a single communication.

Thus, with the conventional design methods for multidimensional traffic or the traffic control approach disclosed in Japanese Patent Application Publication No. 11-41239, an impartial call loss rate is obtained, but the general utilization of the resources disadvantageously decreases if a larger number of communications each require a large amount of resources.

SUMMARY OF THE INVENTION

The present invention is provided in view of these problems, and it is an object thereof to provide a communication system that can maintain the general utilization of resources even if a larger number of communications each require a large amount of resources under multidimensional traffic conditions.

To attain this object, a first aspect of the present invention provides a mobile communication system comprising a second node for assigning a resource shared by a plurality of communications in response to a resource request transmitted by a first node, the system being characterized in that the second node comprises measuring means for measuring a current traffic or an amount equivalent to the traffic, first determining means for determining whether or not to accept the resource request by comparing the current traffic or the amount equivalent to the traffic as measured by the measuring means with a reference value, and accepting means for accepting the resource request on the basis of a result of the determination by the first determining means.

Accordingly, in a communication system in which the amount of resources requested varies among communications, the resources can be assigned so as to be more efficiently shared.

Further, a second aspect of the present invention is the communication system according to the first aspect, characterized in that the reference value is set so that the larger the amount of the resource requested by the first node, the more unlikely the resource request is accepted.

Accordingly, in a communication system in which the amount of resources requested varies among communications, it is possible to measure the current traffic or the equivalent amount, set a threshold value for determining acceptance on the basis of such a reference that the threshold value decreases with an increase in the amount of resources on the bases of the amount of resources newly requested, and accept the reception of the new resource request if the measured current traffic does not exceed the determined threshold value.

Further, a third aspect of the present invention is the communication system according to the first or second aspect, characterized in that if the first determining means determines that the resource request is not to be accepted, the communication is continued by using a resource competitively used by a plurality of communications.

With this approach, the communication can be continued even if a resource to be occupied cannot be assigned.

Further, a fourth aspect of the present invention is the communication system according to any of the first to third aspect, characterized by further comprising second determining means for determining whether or not the amount of the resource requested by the first node can be reduced if the current traffic or the amount equivalent to the traffic exceeds the reference value, and in that the first determining means determines whether or not to accept the resource request if the second determining means determines that the resource amount can be reduced.

Consequently, if the second node determines that the resource request cannot be accepted, the amount of the resource requested can be reduced, and another request can be made for resource assignment.

Further, a fifth aspect of the present invention is the communication system according to the forth aspect, characterized by further comprising third determining means for determining whether or not there is any free resource that is equivalent to the requested resource if the first determining means determines that the request for resource assignment is to be accepted, and in that if the third determining means determines that there is no such a free resource, the second determining means determines whether or not the resource amount can be reduced.

Consequently, if it is determined that the request can be accepted, it can be checked whether or not there is any free resource equivalent to the requested resource, and it can then be determined that the request cannot be accepted if there is no such a free space.

Further, a sixth aspect of the present invention is the communication system according to the fourth or forth aspect, characterized in that if the second determining means determines that the resource amount cannot be reduced, the communication is continued by using a resource competitively used by a plurality of communications.

Consequently, if it is determined that the request can be accepted, the communication is continued by using a resource competitively used by a plurality of communications.

Further, a seventh aspect of the present invention is the communication system according to any of the first to sixth aspects, characterized in that the communication system comprises a plurality of base stations and a plurality of mobile stations communicating with the base stations via radio channels, and the measuring means measures the current traffic by counting the number of radio channels currently used in the communication system.

Consequently, the current traffic can be measured even in mobile communication systems based on the FDMA or TDMA method.

Further, an eighth aspect of the present invention is the communication system according to any of the first to sixth aspects, characterized in that the communication system comprises a plurality of base stations and a plurality of mobile stations communicating with the base stations by spreading an information data modulating signal using a spreading code, and the measuring means measures the current traffic by measuring interference power of signals received by the base stations.

Accordingly, even in mobile communication systems based on the CDMA method, the current traffic can be measured by measuring the interference power to which the radio base stations are subjected.

Further, a ninth aspect of the present invention is the communication system according to any of the first to sixth aspects, characterized in that the communication system comprises a plurality of base stations and a plurality of mobile stations communicating with the base stations by spreading an information data modulating signal using a spreading code, and the measuring means measures the current traffic by measuring total power transmitted by the base stations.

Accordingly, even in mobile communication systems based on the CDMA method, the current traffic can be measured by measuring the total power transmitted by the radio base stations.

Further, a tenth aspect of the present invention provides a resource assigning method for a communication system which is executed by a second node on the basis of a request for a resource shared by a plurality of communications, the request being transmitted by a first node, the method being characterized by comprising a measuring step of measuring a current traffic or an amount equivalent to the traffic, a first determining step of determining whether or not to accept the resource request by comparing the current traffic or the amount equivalent to the traffic as measured in the measuring step with a reference value, and an accepting step of accepting the resource request on the basis of a result of the determination in the first determining step.

Further, an eleventh aspect of the present invention is the resource assigning method according to the tenth aspect, characterized in that the reference value is set so that the larger the amount of the resource requested by the first node, the more unlikely the resource request is accepted.

Furthermore, a twelfth aspect of the present invention is the resource assigning method according to the ten or eleventh aspect, characterized in that if the first determining step determines that the resource request is not to be accepted, the communication is continued by using a resource competitively used by a plurality of communications.

Moreover, a thirteenth aspect of the present invention is the resource assigning method according to any of the first to third aspect, characterized by further comprising a second determining step of determining whether or not the amount of the resource requested by the first node can be reduced if the current traffic or the amount equivalent to the traffic exceeds the reference value, and in that the first determining step determines whether or not to accept the resource request if the second determining step determines that the resource amount can be reduced.

Further, a fourteenth aspect of the present invention is the resource assigning method according to the thirteenth aspect, characterized by further comprising third determining step of determining whether or not there is any free resource that is equivalent to the requested resource if the first determining step determines that the request for resource assignment is to be accepted, and in that if the third determining step determines that there is no such a free resource, the second determining step determines whether or not the resource amount can be reduced.

Furthermore, a fifteenth aspect of the present invention is the resource assigning method according to the thirteenth or fourteenth aspect, characterized in that if the second determining step determines that the resource amount cannot be reduced, the communication is continued by using a resource competitively used by a plurality of communications.

Moreover, a sixteenth aspect of the present invention is the resource assigning method according to any of the tenth to fifteenth aspect, characterized in that the communication system comprises a plurality of base stations and a plurality of mobile stations communicating with the base stations via radio channels, and the measuring step measures the current traffic by counting the number of radio channels currently used in the resource assigning method.

Further, a seventeenth aspect of the present invention is the resource assigning method according to any of the tenth or fifteenth aspect, characterized in that the communication system comprises a plurality of base stations and a plurality of mobile stations communicating with the base stations by spreading an information data modulating signal using a spreading code, and the measuring step measures the current traffic by measuring interference power of signals received by the base stations.

Furthermore, an eighteenth aspect of the present invention is the resource assigning method according to any of the tenth to fifteenth aspects, characterized in that the communication system comprises a plurality of base stations and a plurality of mobile stations communicating with the base stations by spreading an information data modulating signal using a spreading code, and the measuring step measures the current traffic by measuring total power transmitted by the base stations.

With this configuration, if the traffic is equal to or more than a fixed amount, communications requiring a large amount of resources have their requested resources reduced before they are allowed to start. Therefore, the utilization of the resources is prevented from decreasing in spite of the presence of the communications requiring a large amount of resources.

As described above, according to the present invention, for a communication system in which resources are each shared by a plurality of users, a resource assigning method can be provided which avoids reducing the resource utilization of the entire system even under what is called a multidimensional traffic condition in which the amount of sources requested varies among communications.

The above and other objects, effects, features and advantages of the present invention will become more apparent from the following description of embodiments thereof taken in conjunction with the accompanying drawings.

BRIEF DESCRIPTION OF THE DRAWINGS

FIG. 3A is a flow chart of the operation, and FIG. 3B is a chart showing how data used during the operation is stored on a memory;

DETAILED DESCRIPTION OF PREFERRED EMBODIMENTS

Embodiments of the present invention will be described below in detail with reference to the drawings.

(First Embodiment)

Figure 1:
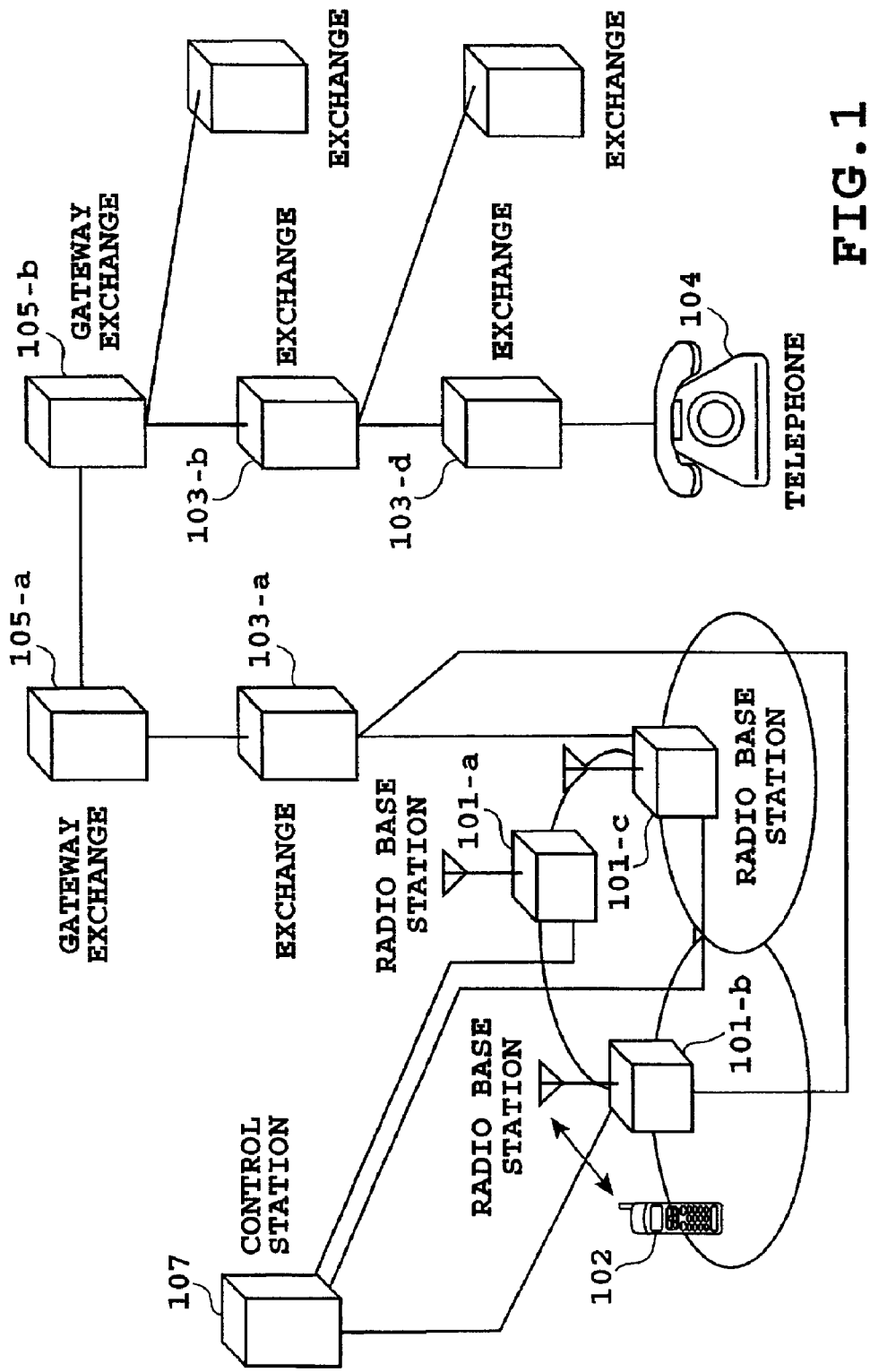
FIG. 1 is a diagram showing a communication system to which a resource assigning method of the present invention is applied.

FIG. 1 is a diagram showing a communication system to which a resource assigning method of the present invention is applied. This figure shows a fixed telephone network for general homes and the like and a mobile communication system. For example, in the following description, a mobile station 102 belonging to the mobile communication system calls a telephone 104 at a general home belonging to the fixed telephone network. The mobile station 102 requests a base station 101-*b* to assign resources required for communication.

In the mobile communication system, a control station 107 for controlling operations of a plurality of radio base stations determines paths required to connect the base station 101 (101-*a*, 101*b*, or 101-*c*) to a fixed telephone and controls the assignment of a circuit in each of the paths. Under the control of the control station 107, the base station 101-*b* is connected to the fixed telephone network via gateway exchanges 105*a* and 105*b*, a path within the fixed telephone network are determined, and the base station 101-*b* then reaches the target telephone 104 via a plurality of exchanges 103-*b* and 103-*d*. The path from the mobile station 102 to the fixed telephone 104 requires various resources: for example, a radio channel between the mobile station 102 the radio base station 101, resources on a transmission path from the base station 101 to an exchange 103-*a*, transmission path resources between the exchanges 103, and hardware resources on each of the above nodes (connection points accessible to the network, including the above described base station 101, exchange 103, gateway exchange 105, and control station 107).

The resource assignment according to this embodiment is applicable to each node when constituted to measure the traffic on each of the nodes shown in FIG. 1. In this case, resource assignment requests from user terminals may be directly used or each node may calculate resources required for itself and issue a resource assignment request to a destination node.

Figure 2:
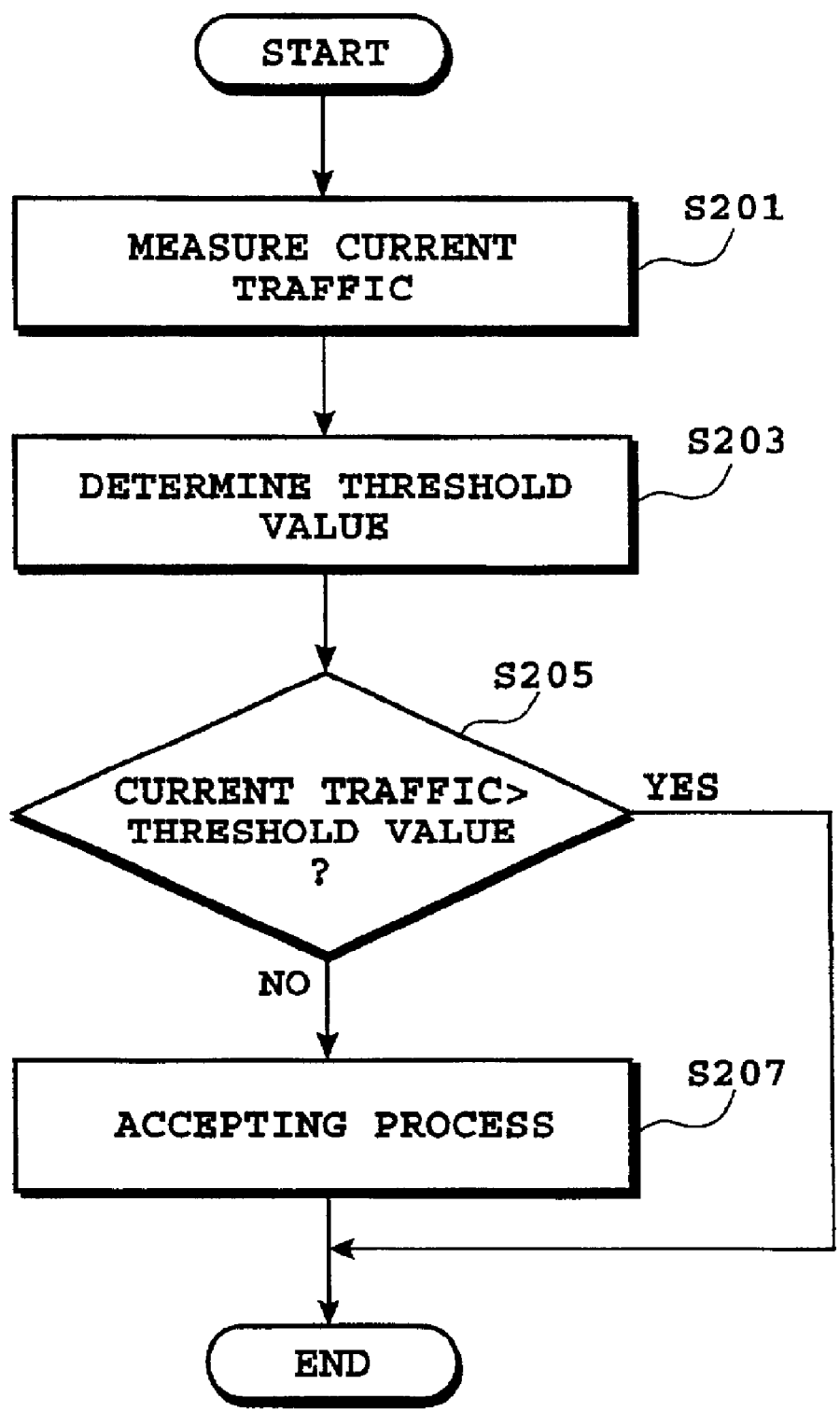
FIG. 2 is a flow chart useful in describing an operation according to an embodiment of the present invention.

FIG. 2 is a flow chart useful in describing the resource assigning method in the communication system according to this embodiment. First, the current traffic is measured (step S201). Then, a threshold value (reference value) is determined on the basis of the amount of resources requested (step S203). Then, the current traffic is compared with the threshold value to determine whether or not to accept the resource request (step S205). That is, if the measured traffic exceeds the threshold value, it is determined that the request cannot be accepted. In contrast, if the measured traffic is equal to or smaller than the threshold value, it is determined that the request can be accepted, and a process of accepting the resource request is executed to end the entire process (step S207).

Figures 3A, 3B:
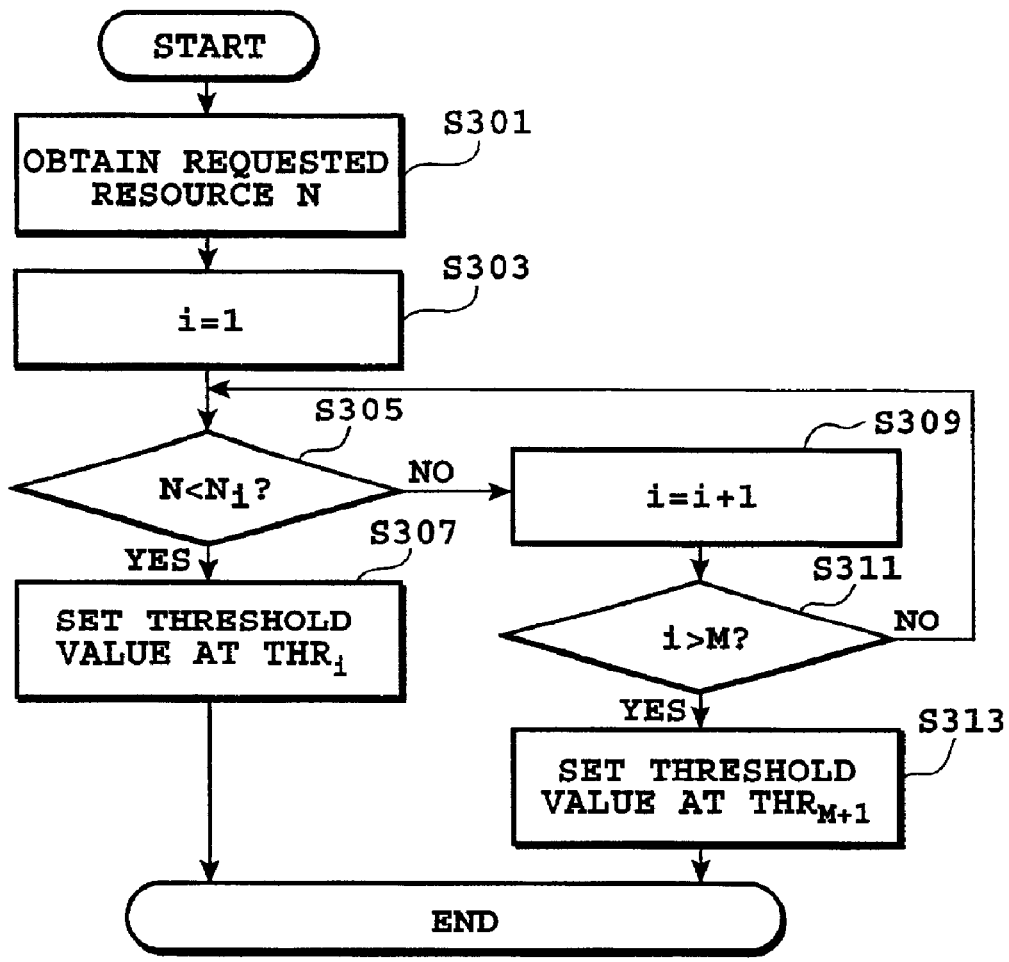
FIGS. 3A and 3B are diagrams useful in describing in detail an example of an operation by a section, shown in FIG. 2, for determining a threshold value.

FIGS. 3A and 3B are diagrams useful in describing in detail an example of an operation by a section, shown in FIG. 2, for determining a threshold value. FIG. 3A is a flow chart of the operation, and FIG. 3B is a chart showing how data used during the operation is stored on a memory.

First, a requested resource amount N is obtained on the basis of information transmitted by a user (step S301). Then, a variable i is initialized to 1 (step S303), and a value $N_i$ is obtained from the memory. Then, the requested resource amount N is compared with the value $N_i$ (step S305). If the amount N is smaller than the value $N_i$, a threshold value $THR_i$ corresponding to the value $N_i$ is obtained from the memory to end the process (step S307). On the other hand, if the amount N is equal to or larger than the value $N_i$, the variable i is increased by one (step S309), and the variable i is compared with a maximum value M (step S311).

If a result of the comparison shows that the variable i has not reached the maximum value M, the next process is continuously executed. If the variable i has reached the maximum value M, a threshold value THRM+1 is obtained from the memory to end the process (step S313).

An example of the operation of determining the threshold value has been shown, but the present invention is not limited by this embodiment. For example, instead of the method described in FIGS. 3A and 3B, a requested traffic N and constants C1 and C2 as well as the following equation may be used.

$$THR = C1 - N \times C2 \qquad \text{[Equation 1]}$$

With either of these methods, the larger the requested traffic N is, the smaller the set threshold THR is. That is, similar effects are obtained as long as the method is constituted so that the larger the requested traffic is, the more unlikely the resource request is accepted.

(Second Embodiment)

In the above described embodiment, the resource assigning process is ended only if the current traffic exceeds the threshold value. The resource assigning process, however, may be repeated if the requested resource amount can be reduced.

Figure 4:
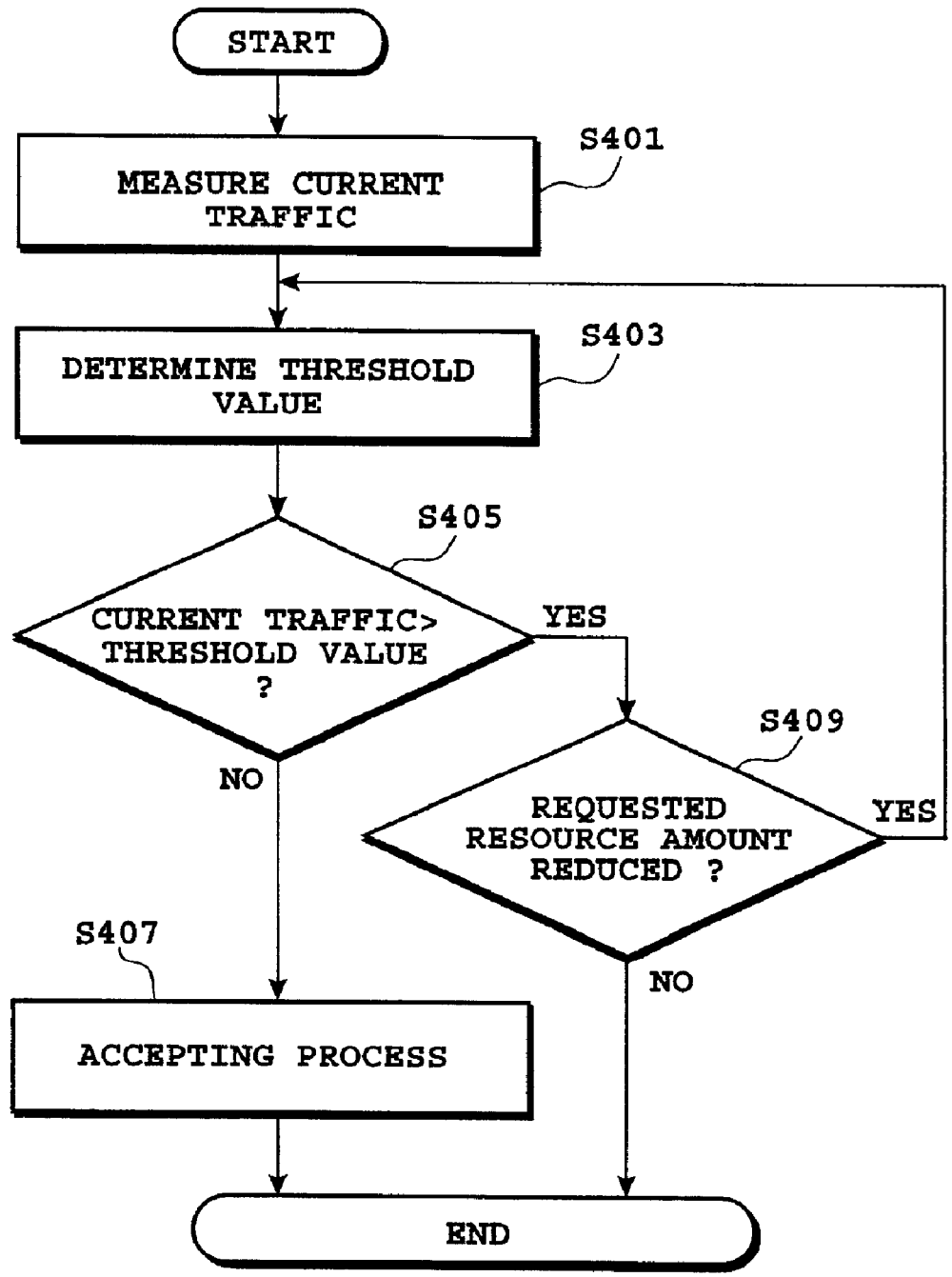
FIG. 4 is a flow chart useful in describing an operation according to an embodiment of the present invention.

FIG. 4 is a flow chart useful in describing an operation according to another embodiment of the present invention. First, the current traffic is measured, and then a threshold is determined (steps S401 and S403). To determine the threshold, for example, the configurations shown in FIGS. 3A and 3B may be used.

Then, the determined threshold value is compared with the measured traffic (step S405). If the measured traffic is equal to or smaller than the threshold, it is determined that the request can be accepted, and the process is accepting the resource request to end the entire process (step S407). On the other hand, if the measured traffic exceeds the threshold value, it is determined whether or not the requested resource amount can be reduced (step S409). In this case, the requested resource amount cannot be reduced, for example, if the user designates only one transmission rate and does not desire to use other rates for communication, or if the transmission rate has already reached a minimum value provided for the system to hinder the resources from being further reduced.

If it is determined in the determining process in step S409 that the requested resource amount cannot be reduced, the entire process is ended. On the other hand, if it is determined that the requested resource amount can be reduced, the process returns to step S403 to set the threshold again and then to shift to step S405 to determine whether or not to accept the resource request.

(Third Embodiment)

In the above embodiments, it is determined whether or not the requested resource amount can be reduced only if the current traffic exceeds the threshold value. This determining process, however, is not limited to this case but can be executed if there is no free resource equivalent to the requested resource.

Figure 5:
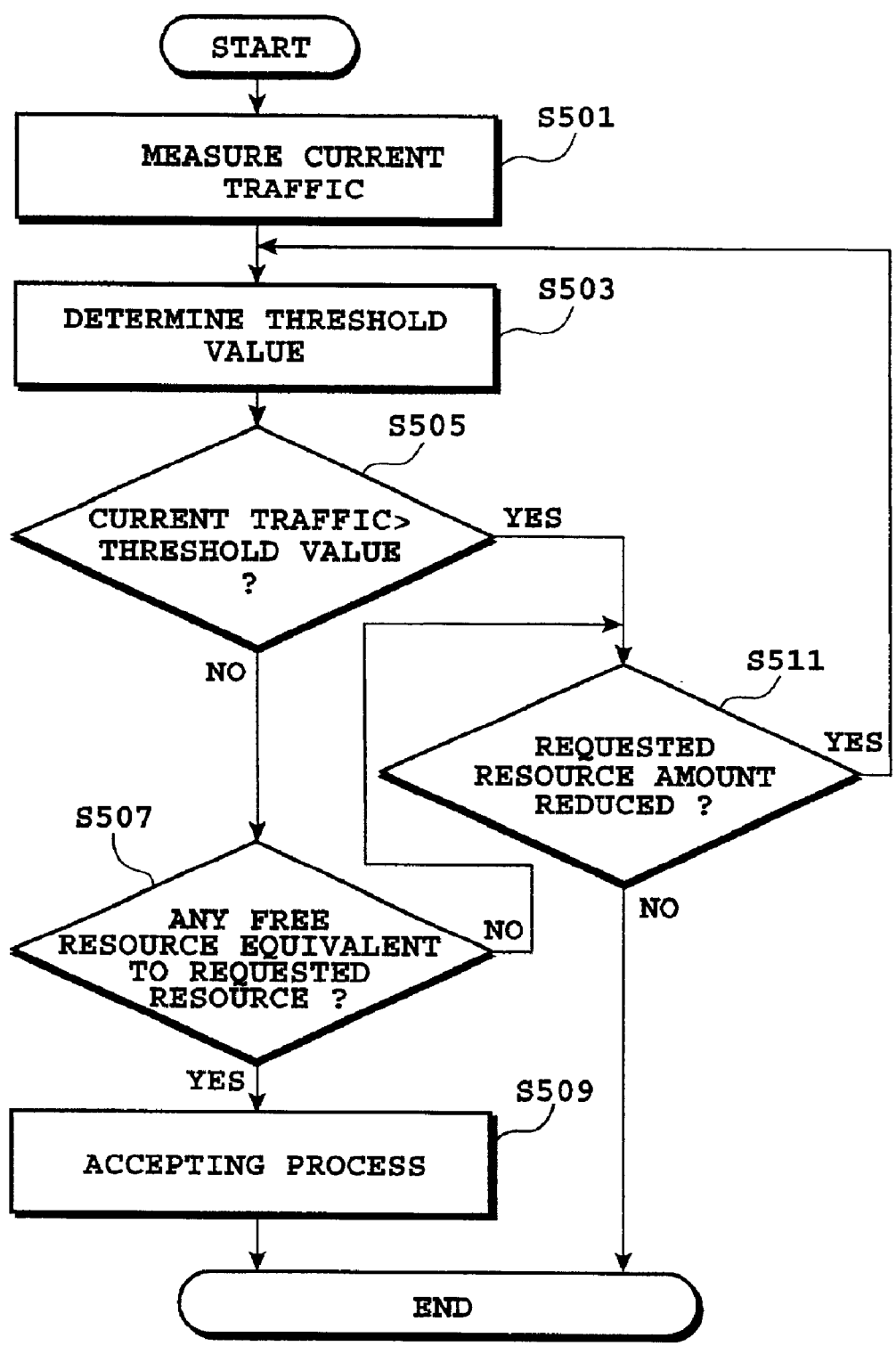
FIG. 5 is a flow chart useful in describing an operation according to an embodiment of the present invention.

FIG. 5 is a flow chart useful in describing an operation according to another embodiment of the present invention. First, the current traffic is measured, and then a threshold is determined (steps S501 and S503). The threshold can be determined, for example, as shown in FIGS. 3A and 3B. Then, the determined threshold is compared with the measured traffic (step S505). If the measured traffic is smaller than the threshold value, it is determined that the request can be accepted, and the process shifts to a step of checking for free resources. That is, it is checked whether or not there is any free resource equivalent to the currently requested resource (step S507).

If a result of the check in step S507 indicates that there is such a free resource, the process of accepting the resource request is executed to end the entire process (step S509). On the other hand, if there is no such a free resource, it is determined that the request cannot be accepted, and the process shifts to a step of checking whether or not the requested resource amount can be reduced (step S511). If the measured traffic exceeds the threshold, it is checked whether or not the requested resource amount can be reduced (step S511). Here, the requested resource amount cannot be reduced, for example, if the user designates only one transmission rate and does not desire to use other rates for communication, or if the transmission rate has already reached a minimum value provided for the system to hinder the resources from being further reduced.

In this determining process, if it is determined that the requested resource amount cannot be reduced, the entire process is ended. If it is determined that the requested resource amount can be reduced, the process is continued by returning to the step of setting the threshold.

Figure 6:
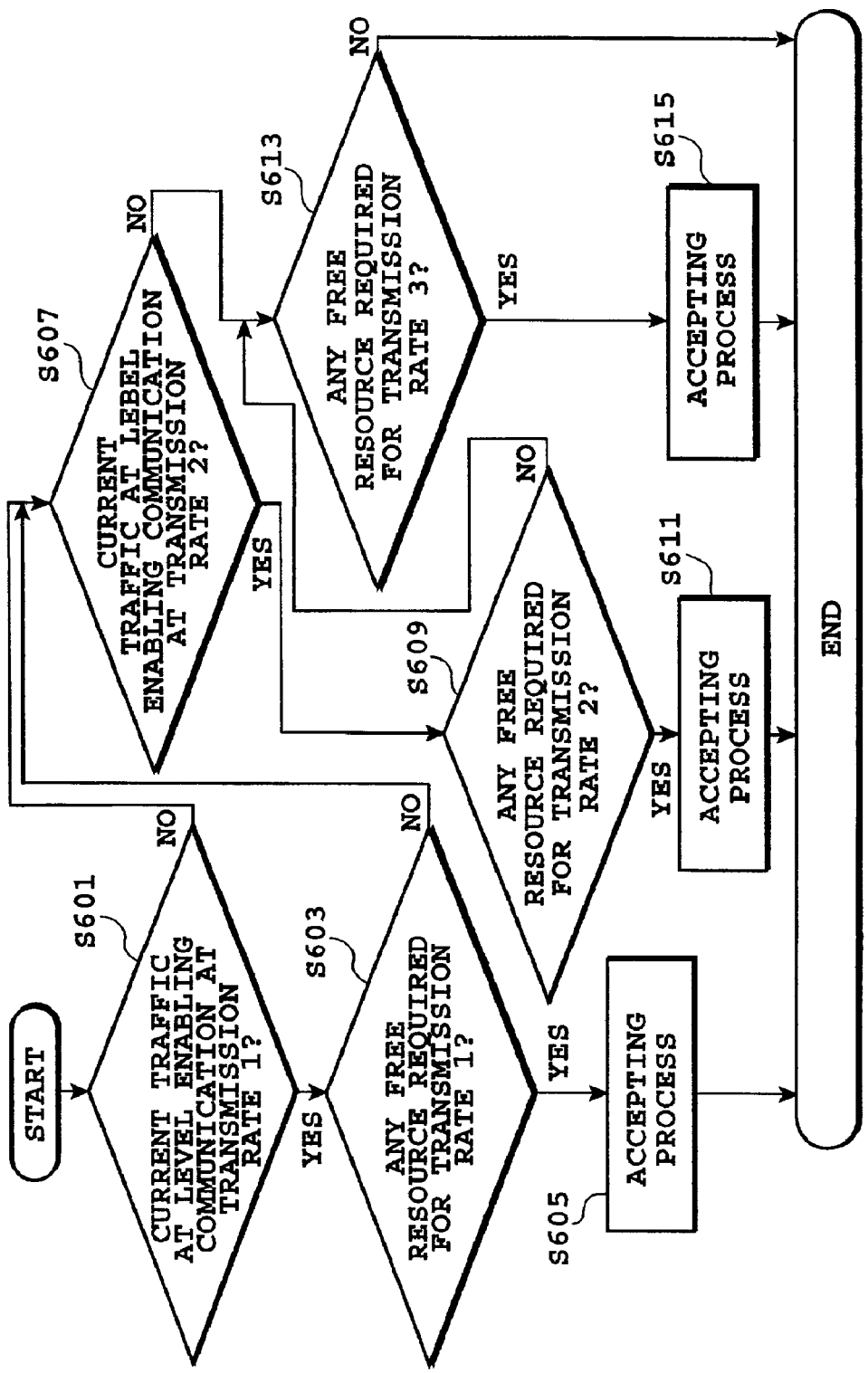
FIG. 6 is a flow chart useful in describing an operation according to an embodiment of the present invention.

The above process enables such an operation as shown in FIG. 6 to be implemented if, for example, the system provides three transmission rates 1, 2, and 3 (transmission rate 1>transmission rate 2>transmission rate 3). If the entire traffic has not reached a fixed value, assignment is attempted with the transmission rate 1 (steps S601 and S603). If the assignment fails here, the transmission rate is reduced to attempt the assignment with the transmission rate 2. If the entire traffic has reached some level of lower values, assignment is attempted with the transmission rate 2 (steps S607 and S609). If the assignment still fails, the transmission rate is further reduced to attempt the assignment with the transmission rate 3 (steps S613 and S615). If the assignment fails with any of the transmission rates, a call loss occurs.

In the description of the operation with reference to FIGS. 2 and 4 to 6, the process is ended if it is determined that the resource request cannot be accepted, but this does not mean that the communication itself cannot be continued. Many communication systems provide both forms of communication in which a single user exclusively uses a certain resource and in which a plurality of users competitively share the same resource.

To share resources in this manner, for example, the ALOHA method uses random accesses as in the ALOHA method, or local area networks (LANs) use a method of freely transmitting data unless another user's carrier is detected. Methods by which a plurality of users competitively share resources are described in L. Kleinrock, "Queuing Systems Volume II: Computer Applications, " John Wiley & Sons, 1976 and other documents in detail, and description thereof is omitted. With such a method, even if a resource to be occupied fails to be assigned, the communication can be continued by using a resource competitively used by a plurality of communications.

Further, various methods can be used to measure the current traffic as in the description of the operation with reference to FIGS. 2 and 4 to 6. As described above, for fixed communication networks in which exchanges are connected together via lead wires or optical fibers, the current traffic can be measured by counting the number of circuits being used by the exchanges, counting the number of circuits being used in the transmission paths (lead wires or optical paths), or measuring the amount of information being transmitted.

Further, for mobile communication systems based on the FDMA or TDMA method by which a plurality of base stations and a plurality of mobile stations communicate with one another via radio channels, the current traffic can be measured by counting the number of radio channels being used by the radio base stations or counting the number of radio slots being used.

Furthermore, for mobile communication systems based on the CDMA method by which a plurality of base stations and a plurality of mobile stations communicate with one another by spreading an information data modulating signal using a spreading signal with a rate higher than that of the former signal, the current traffic can be measured by measuring signal interference power to which the radio base stations are subjected or measuring the total power of signals transmitted by the base stations.

With any of the measuring methods, the present invention is applicable, and effects similar to those of the present invention are obtained, as long as the method enables measurement of a value indicative of the status of loads on the system at the time of the measurement. Further, the measured traffic value may be directly used or processed, or an amount such as an average value which corresponds to the current traffic may be calculated on the basis of the measured value.

For example, for typical communication systems, a method is often employed which counts the number of circuits in use every several seconds and averages a resulting sequence of measured values over several minutes. In this manner, a value may be used which is obtained by averaging a set of values measured over several minutes or tens of minutes or hours.

Further, the averaging operation may use a result obtained by using a filter that removes short-time varying components or removes long-time varying components while extracting short-time varying components. Alternatively, it is possible to use the median of a plurality of measured values obtained within a certain period, or a statistical value at a predetermined position of a sequence of measured values arranged in an ascending order.

The present invention has been described in detail with respect to preferred embodiments, and it will now be apparent from the foregoing to those skilled in the art that changes and modifications may be made without departing from the invention in its broader aspects, and it is the intention, therefore, in the appended claims to cover all such changes and modifications as fall within the true spirit of the invention.

What is claimed is:

1. A mobile communication system comprising a second node for assigning a resource shared by a plurality of communications in response to a resource request transmitted by a first node, the system being characterized in that:

said second node comprises:

measuring means for measuring a current traffic or an amount equivalent to the traffic;

first determining means for determining that said resource request is to be accepted if said current traffic or the amount equivalent to the traffic as measured by the measuring means is less than a reference value, the larger the amount of resources requested by said first node, the smaller said reference value is set; and accepting means for accepting said resource request if said first determining means determines that said resource request is to be accepted, wherein the larger the amount of said resource requested by said first node, the more unlikely said resource request is accepted.

2. The communication system according to claim 1 characterized in that if said first determining means determines that the resource request is not to be accepted, the communication is continued by using a common resource competitively used by a plurality of communications.

3. The communication system according to claim 1, characterized by further comprising second determining means for determining whether or not the amount of said resource requested by said first node can be reduced if said current traffic or the amount equivalent to the traffic exceeds said reference value, and in that said first determining means determines whether or not to accept said resource request if said second determining means determines that said resource amount can be reduced.

4. The communication system according to claim 1, characterized in that said communication system comprises a plurality of base stations and a plurality of mobile stations mutually communicating with said base stations via radio channels, and said measuring means measures said current traffic by counting the number of radio channels currently used in said communication system.

5. The communication system according to claim 1, characterized in that said communication system comprises a plurality of base stations and a plurality of mobile stations mutually communicating with said base stations by spreading an information data modulating signal using a spreading code, and said measuring means measures said current traffic by measuring interference power of signals received by said base stations.

6. The communication system according to claim 1, characterized in that said communication system comprises a plurality of base stations and a plurality of mobile stations mutually communicating with said base stations by spreading an information data modulating signal using a spreading code, and said measuring means measures said current traffic by measuring total power transmitted by said base stations.

7. The communication system according to claim 2, characterized by further comprising second determining means for determining whether or not the amount of said resource requested by said first node can be reduced if said current traffic or the amount equivalent to the traffic exceeds said reference value, and in that said first determining means determines whether or not to accept said resource request if said second determining means determines that said resource amount can be reduced.

8. The communication system according to claim 2, characterized in that said communication system comprises a plurality of base stations and a plurality of mobile stations mutually communicating with said base stations via radio channels, and said measuring means measures said current traffic by counting the number of radio channels currently used in said communication system.

9. The communication system according to claim 2, characterized in that said communication system comprises a plurality of base stations and a plurality of mobile stations mutually communicating with said base stations by spreading an information data modulating signal using a spreading code, and said measuring means measures said current traffic by measuring interference power of signals received by said base stations.

10. The communication system according to claim 2, characterized in that said communication system comprises a plurality of base stations and a plurality of mobile stations mutually communicating with said base stations by spreading an information data modulating signal using a spreading code, and said measuring means measures said current traffic by measuring total power transmitted by said base stations.

11. The communication system according to claim 3, characterized by further comprising third determining means for determining whether or not there is any free resource that is equivalent to said requested resource if said first determining means determines that request for said resource assignment is to be accepted, and in that if said third determining means determines that there is no such a free resource, said second determining means determines whether or not said resource amount can be reduced.

12. The communication system according to claim 3, characterized in that if said second determining means determines that said resource amount cannot be reduced, the communication is continued by using a common resource competitively used by a plurality of communications.

13. The communication system according to claim 7, characterized by further comprising third determining means for determining whether or not there is any free resource that is equivalent to said requested resource if said first determining means determines that request for said resource assignment is to be accepted, and in that if said third determining means determines that there is no such a free resource, said second determining means determines whether or not said resource amount can be reduced.

14. The communication system according to claim 7, characterized in that if said second determining means determines that said resource amount cannot be reduced, said communication is continued by using a resource competitively used by a plurality of communications.

15. The communication system according to claim 7, characterized in that said communication system comprises a plurality of base stations and a plurality of mobile stations mutually communicating with said base stations via radio channels, and said measuring means measures said current traffic by counting the number of radio channels currently used in said communication system.

16. The communication system according to claim 7, characterized in that said communication system comprises a plurality of base stations and a plurality of mobile stations mutually communicating with said base stations by spreading an information data modulating signal using a spreading code, and said measuring means measures said current traffic by measuring interference power of signals received by said base stations.

17. The communication system according to claim 7, characterized in that said communication system comprises a plurality of base stations and a plurality of mobile stations mutually communicating with said base stations by spreading an information data modulating signal using a spreading code, and said measuring means measures said current traffic by measuring total power transmitted by said base stations.

18. The communication system according to claim 11, characterized in that if said second determining means determines that said resource amount cannot be reduced, said communication is continued by using a resource competitively used by a plurality of communications.

19. The communication system according to claim 13, characterized in that if said second determining means determines that said resource amount cannot be reduced, said communication is continued by using a resource competitively used by a plurality of communications.

20. The communication system according to claim 13, characterized in that said communication system comprises a plurality of base stations and a plurality of mobile stations mutually communicating with said base stations via radio channels, and said measuring means measures said current traffic by counting the number of radio channels currently used in said communication system.

21. The communication system according to claim 13, characterized in that said communication system comprises a plurality of base stations and a plurality of mobile stations mutually communicating with said base stations by spreading an information data modulating signal using a spreading code, and said measuring means measures said current traffic by measuring interference power of signals received by said base stations.

22. The communication system according to claim 13, characterized in that said communication system comprises a plurality of base stations and a plurality of mobile stations mutually communicating with said base stations by spreading an information data modulating signal using a spreading code, and said measuring means measures said current traffic by measuring total power transmitted by said base stations.

23. The communication system according to claim 19, characterized in that said communication system comprises a plurality of base stations and a plurality of mobile stations mutually communicating with said base stations via radio channels, and said measuring means measures said current traffic by counting the number of radio channels currently used in said communication system.

24. The communication system according to claim 19, characterized in that said communication system comprises a plurality of base stations and a plurality of mobile stations mutually communicating with said base stations by spreading an information data modulating signal using a spreading code, and said measuring means measures said current traffic by measuring interference power of signals received by said base stations.

25. The communication system according to claim 19, characterized in that said communication system comprises a plurality of base stations and a plurality of mobile stations mutually communicating with said base stations by spreading an information data modulating signal using a spreading code, and said measuring means measures said current traffic by measuring total power transmitted by said base stations.

26. A resource assigning method for a communication system which is executed by a second node on the basis of a request for a resource shared by a plurality of communications, said request being transmitted by a first node, said method being characterized by comprising:

a measuring step of measuring a current traffic or an amount equivalent to the traffic;

a first determining step of determining that said resource request is to be accepted if said current traffic or the amount equivalent to the traffic as measured in said measuring step is less than a reference value, the larger the amount of resources requested by said first node, the smaller said reference value is set; and an accepting step of accepting said resource request if said first determining means determines that said resource request is to be accepted, wherein the larger the amount of said resource requested by said first node, the more unlikely said resource request is accepted.

27. The resource assigning method according to claim 26, characterized in that if said first determining step determines that the resource request is not to be accepted, the communication is continued by using a common resource competitively used by a plurality of communications.

28. The resource assigning method according to claim 26, characterized by further comprising second determining step of determining whether or amount of said resource requested by said first node can be reduced if said current traffic or not the amount equivalent to the traffic exceeds said reference value, and in that said first determining step determines whether or not to accept said resource request if said second determining step determines that said resource amount can be reduced.

29. The resource assigning method according to claim 26, characterized in that said communication system comprises a plurality of base stations and a plurality of mobile stations mutually communicating with said base stations via radio channels, and said measuring step measures said current traffic by counting the number of radio channels currently used in said communication system.

30. The resource assigning method according to claim 26, characterized in that said communication system comprises a plurality of base stations and a plurality of mobile stations mutually communicating with said base stations by spreading an information data modulating signal using a spreading code, and said measuring step measures said current traffic by measuring interference power of signals received by said base stations.

31. The resource assigning method according to claim 26, characterized in that said communication system comprises a plurality of base stations and a plurality of mobile stations mutually communicating with said base stations by spreading an information data modulating signal using a spreading code, and said measuring step measures said current traffic by measuring total power transmitted by said base stations.

32. The resource assigning method according to claim 27, characterized by further comprising second determining step of determining whether or not the amount of said resource requested by said first node can be reduced if said current traffic or the amount equivalent to the traffic exceeds said reference value, and in that said first determining step determines whether or not to accept said resource request if said second determining step determines that said resource amount can be reduced.

33. The resource assigning method according to claim 27, characterized in that said communication system comprises a plurality of base stations and a plurality of mobile stations mutually communicating with said base stations via radio channels, and said measuring step measures said current traffic by counting the number of radio channels currently used in said communication system.

34. The resource assigning method according to claim 27, characterized in that said communication system comprises a plurality of base stations and a plurality of mobile stations mutually communicating with said base stations by spreading an information data modulating signal using a spreading code, and said measuring step measures said current traffic by measuring interference power of signals received by said base stations.

35. The resource assigning method according to claim 27, characterized in that said communication system comprises a plurality of base stations and a plurality of mobile stations mutually communicating with said base stations by spreading an information data modulating signal using a spreading code, and said measuring step measures said current traffic by measuring total power transmitted by said base stations.

36. The resource assigning method according to claim 28, characterized by further comprising third determining step of determining whether or not there is any free resource that is equivalent to said requested resource if said first determining step determines that request for said resource assignment is to be accepted, and in that if said third determining step determines that there is no such a free resource, said second determining step determines whether or not said resource amount can be reduced.

37. The resource assigning method according to claim 28, characterized in that if said second determining step determines that said resource amount cannot be reduced, said communication is continued by using a common resource competitively used by a plurality of communications.

38. The resource assigning method according to claim 28, characterized by further comprising third determining step of determining whether or not there is any free resource that is equivalent to said requested resource if said first determining step determines that request for said resource assignment is to be accepted, and in that if said third determining step determines that there is no such a free resource, said second determining step determines whether or not said resource amount can be reduced.

39. The resource assigning method according to claim 32, characterized in that if said second determining step determines that said resource amount cannot be reduced, said communication is continued by using a common resource competitively used by a plurality of communications.

40. The resource assigning method according to claim 32, characterized in that said communication system comprises a plurality of base stations and a plurality of mobile stations mutually communicating with said base stations via radio channels, and said measuring step measures said current traffic by counting the number of radio channels currently used in said communication system.

41. The resource assigning method according to claim 32, characterized in that said communication system comprises a plurality of base stations and a plurality of mobile stations mutually communicating with said base stations by spreading an information data modulating signal using a spreading code, and said measuring step measures said current traffic by measuring interference power of signals received by said base stations.

42. The resource assigning method according to claim 32, characterized in that said communication system comprises a plurality of base stations and a plurality of mobile stations mutually communicating with said base stations by spreading an information data modulating signal using a spreading code, and said measuring step measures said current traffic by measuring total power transmitted by said base stations.

43. The resource assigning method according to claim 36, characterized in that if said second determining step determines that said resource amount cannot be reduced, said communication is continued by using a common resource competitively used by a plurality of communications.

44. The resource assigning method according to claim 38, characterized in that if said second determining step determines that said resource amount cannot be reduced, said communication is continued by using a common resource competitively used by a plurality of communications.

45. The resource assigning method according to claim 38, characterized in that said communication system comprises a plurality of base stations and a plurality of mobile stations mutually communicating with said base stations via radio channels, and said measuring step measures said current traffic by counting the number of radio channels currently used in said communication system.

46. The resource assigning method according to claim 38, characterized in that said communication system comprises a plurality of base stations and a plurality of mobile stations mutually communicating with said base stations by spreading an information data modulating signal using a spreading code, and said measuring step measures said current traffic by measuring interference power of signals received by said base stations.

47. The resource assigning method according to claim 38, characterized in that said communication system comprises a plurality of base stations and a plurality of mobile stations mutually communicating with said base stations by spreading an information data modulating signal using a spreading code, and said measuring step measures said current traffic by measuring total power transmitted by said base stations.

48. The resource assigning method according to claim 44, characterized in that said communication system comprises a plurality of base stations and a plurality of mobile stations mutually communicating with said base stations via radio channels, and said measuring step measures said current traffic by counting the number of radio channels currently used in said communication system.

49. The resource assigning method according to claim 44, characterized in that said communication system comprises a plurality of base stations and a plurality of mobile stations mutually communicating with said base stations by spreading an information data modulating signal using a spreading code, and said measuring step measures said current traffic by measuring interference power of signals received by said base stations.

50. The resource assigning method according to claim 44, characterized in that said communication system comprises a plurality of base stations and a plurality of mobile stations mutually communicating with said base stations by spreading an information data modulating signal using a spreading code, and said measuring step measures said current traffic by measuring total power transmitted by said base stations.

51. A communication control apparatus for assigning a resource shared by a plurality of communications in response to a resource request transmitted by a terminal, the apparatus being characterized by comprising:

measuring means for measuring a current traffic or an amount equivalent to the traffic;

first determining means for determining that said resource request is to be accepted if said current traffic or the amount equivalent to the traffic as measured by said measuring means is less than a reference value, the larger the amount of resources requested by said first node, the smaller said reference value is set; and accepting means for accepting said resource request if said first determining means determines that said resource request is to be accepted, wherein the larger the amount of said resource requested by said first node, the more unlikely said resource request is accepted.

52. The communication control apparatus according to claim 51 characterized in that if said first determining means determines that said resource request is not to be accepted, die communication between the terminals is continued by using a common resource competitively used by a plurality of communications.

53. The communication control apparatus according to claim 51, characterized by further comprising second determining means for determining whether or not the amount of said resource requested by said terminal can be reduced if said current traffic or the amount equivalent to die traffic exceeds said reference value, and in that said first determining means determines whether or not to accept said resource request if said second determining means determines that said resource amount can be reduced.

54. The communication control apparatus according to claim 51, characterized in that said communication control apparatus is applied to a communication system comprising a plurality of base stations and at least one mobile station communicating with said base stations via radio channels, and said measuring means measures said current traffic by counting the number of radio channels currently used in said base stations.

55. The communication control apparatus according to claim 51, characterized in that said communication control apparatus is applied to a communication system comprising a plurality of base stations and at least one mobile station communicating with said base stations by spreading an information data modulating signal using a spreading code, and said measuring means measures said current traffic by measuring interference power of signals received by said base stations.

56. The communication control apparatus according to claim 51, characterized in that said communication control apparatus is applied to a communication system comprising a plurality of base stations and at least one mobile station communicating with said base stations by spreading an information data modulating signal using a spreading code, and said measuring means measures said current traffic by measuring total power transmitted by said base stations.

57. The communication control apparatus according to claim 52, characterized by further comprising second determining means for determining whether or not the amount of said resource requested by said terminal can be reduced if said current traffic or the amount equivalent to the traffic exceeds said reference value, and in that said first determining means determines whether or not to accept said resource request if said second determining means determines that said resource amount can be reduced.

58. The communication control apparatus according to claim 52, characterized in that said communication control apparatus is applied to a communication system comprising a plurality of base stations and at least one mobile station communicating with said base stations via radio channels, and said measuring means measures said current traffic by counting the number of radio channels currently used in said base stations.

59. The communication control apparatus according to claim 52, characterized in that said communication control apparatus is applied to a communication system comprising a plurality of base stations and at least one mobile station communicating with said base stations by spreading an information data modulating signal using a spreading code, and said measuring means measures said current traffic by measuring interference power of signals received by said base stations.

60. The communication control apparatus according to claim 52, characterized in that said communication control apparatus is applied to a communication system comprising a plurality of base stations and at least one mobile station communicating with said base stations by spreading an information data modulating signal using a spreading code, and said measuring means measures said current traffic by measuring total power transmitted by said base stations.

61. The communication control apparatus according to claim 53, characterized by further comprising third determining means for determining whether or not there is any free resource that is equivalent to said requested resource if said first determining means determines that request for said resource assignment is to be accepted, and in that if said third determining means determines that there is no such a free resource, said second determining means determines whether or not said resource amount can be reduced.

62. The communication control apparatus according to claim 53, characterized in that if said second determining means determines that said resource amount cannot be reduced, the communication between the terminals is continued by using a common resource competitively used by a plurality of communications.

63. The communication control apparatus according to claim 57, characterized by further comprising third determining means for determining whether or not there is any free resource that is equivalent to said requested resource if said first determining means determines that request for said resource assignment is to be accepted, and in that if said third determining means determines that there is no such a free resource, said second determining means determines whether or not said resource amount can be reduced.

64. The communication control apparatus according to claim 57, characterized in that if said second determining means determines that said resource amount cannot be reduced, the communication between the terminals is continued by using a common resource competitively used by a plurality of communications.

65. The communication control apparatus according to claim 57, characterized in that said communication control apparatus is applied to a communication system comprising a plurality of base stations and at least one mobile station communicating with said base stations via radio channels, and said measuring means measures said current traffic by counting the number of radio channels currently used in said base stations.

66. The communication control apparatus according to claim 57, characterized in that said communication control apparatus is applied to a communication system comprising a plurality of base stations and at least one mobile station communicating with said base stations by spreading an information data modulating signal using a spreading code, and said measuring means measures said current traffic by measuring interference power of signals received by said base stations.

67. The communication control apparatus according to claim 57, characterized in that said communication control apparatus is applied to a communication system comprising a plurality of base stations and at least one mobile station communicating with said base stations by spreading an information data modulating signal using a spreading code, and said measuring means measures said current traffic by measuring total power transmitted by said base stations.

68. The communication control apparatus according to claim 61, characterized in that if said second determining means determines that said resource amount cannot be reduced, the communication between the terminals is continued by using a common resource competitively used by a plurality of communications.

69. The communication control apparatus according to claim 63, characterized in that if said second determining means determines that said resource amount cannot be reduced, the communication between the terminals is continued by using a common resource competitively used by a plurality of communications.

70. The communication control apparatus according to claim 63, characterized in that said communication control apparatus is applied to a communication system comprising a plurality of base stations and at least one mobile station communicating with said base stations via radio channels, and said measuring means measures said current traffic by counting the number of radio channels currently used in said base stations.

71. The communication control apparatus according to claim 63, characterized in that said communication control apparatus is applied to a communication system comprising a plurality of base stations and at least one mobile station communicating with said base stations by spreading an information data modulating signal using a spreading code, and said measuring means measures said current traffic by measuring interference power of signals received by said base stations.

72. The communication control apparatus according to claim 63, characterized in that said communication control apparatus is applied to a communication system comprising a plurality of base stations and at least one mobile station communicating with said base stations by spreading an information data modulating signal using a spreading code, and said measuring means measures said current traffic by measuring total power transmitted by said base stations.

73. The communication control apparatus according to claim 69, characterized in that said communication control apparatus is applied to a communication system comprising a plurality of base stations and at least one mobile station communicating with said base stations via radio channels, and said measuring means measures said current traffic by counting the number of radio channels currently used in said base stations.

74. The communication control apparatus according to claim 69, characterized in that said communication control apparatus is applied to a communication system comprising a plurality of base stations and at least one mobile station communicating with said base stations by spreading an information data modulating signal using a spreading code, and said measuring means measures said current traffic by measuring interference power of signals received by said base stations.

75. The communication control apparatus according to claim 69, characterized in that said communication control apparatus is applied to a communication system comprising a plurality of base stations and at least one mobile station communicating with said base stations by spreading an information data modulating signal using a spreading code, and said measuring means measures said current traffic by measuring total power transmitted by said base stations.

76. A resource assigning method for a communication control apparatus which is based on a request for a resource shared by a plurality of communications, said request being transmitted by a terminal, said method being characterized by comprising:

a measuring step of measuring a current traffic or an amount equivalent to the traffic:

a first determining step of determining that said resource request is to be accepted if by comparing said current traffic or the amount equivalent to the traffic as measured in said measuring step is less than a reference value, the larger the amount of resources requested by said first node, the smaller said reference value is set; and an accepting step of accepting said resource request if said first determining means determines that said resource request is to be accepted, wherein the larger the amount of said resource requested by said first node, the more unlikely said resource request is accepted.

77. The resource assigning method for a communication control apparatus according to claim 76 characterized in that if said first determining means determines that said resource request is not to be accepted, the communication between the terminals is continued by using a common resource competitively used by a plurality of communications.

78. The resource assigning method for a communication control apparatus according to claim 76, characterized by further comprising second determining step of determining whether or not the amount of said resource requested by said first node can be reduced if said current traffic or the amount equivalent to the traffic exceeds said reference value, and in that said first determining step determines whether or not to accept said resource request if said second determining step determines that said resource amount can be reduced.

79. The resource assigning method for a communication control apparatus according to claim 76, characterized in that said communication control apparatus is applied to a communication system comprising a plurality of base stations and at least one mobile station communicating with said base stations via radio channels, and said measuring step measures said current traffic by counting the number of radio channels currently used in said base stations.

80. The resource assigning method for a communication control apparatus according to claim 76, characterized in that said communication control apparatus is applied to a communication system comprising a plurality of base stations and at least one mobile station communicating with said base stations via radio channels, and said measuring step measures said current traffic by counting the number of radio channels currently used in said base stations.

81. The resource assigning method for a communication control apparatus according to claim 76, characterized in that said communication control apparatus is applied to a communication system comprising a plurality of base stations and at least one mobile station communicating with said base stations by spreading an information data modulating signal using a spreading code, and said measuring step measures said current traffic by measuring total power transmitted by said base stations.

82. The resource assigning method for a communication control apparatus according to claim 77, characterized by further comprising second determining step of determining whether or not the amount of said resource requested by said first node can be reduced if said current traffic or the amount equivalent to the traffic exceeds said reference value, and in that said first determining step determines whether or not to accept said resource request if said second determining step determines that said resource amount can be reduced.

83. The resource assigning method for a communication control apparatus according to claim 77, characterized in that said communication control apparatus is applied to a communication system comprising a plurality of base stations and at least one mobile station communicating with said base stations via radio channels, and said measuring step measures said current traffic by counting the number of radio channels currently used in said base stations.

84. The resource assigning method for a communication control apparatus according to claim 77, characterized in that said communication control apparatus is applied to a communication system comprising a plurality of base stations and at least one mobile station communicating with said base stations via radio channels, and said measuring step measures said current traffic by counting the number of radio channels currently used in said base stations.

85. The resource assigning method for a communication control apparatus according to claim 77, characterized in that said communication control apparatus is applied to a communication system comprising a plurality of base stations and at least one mobile station communicating with said base stations by spreading an information data modulating signal using a spreading code, and said measuring step measures said current traffic by measuring total power transmitted by said base stations.

86. The resource assigning method for a communication control apparatus according to claim 78, characterized by further comprising third determining step of determining whether or not there is any free resource that is equivalent to said requested resource if said first determining step determines that request for said resource assignment is to be accepted, and in that if said third determining step determines that there is no such a free resource, said second determining step determines whether or not said resource amount can be reduced.

87. The resource assigning method for a communication control apparatus according to claim 78, characterized in that if said second determining step determines that said resource amount cannot be reduced, said communication between the terminals is continued by using a common resource competitively used by a plurality of communications.

88. The resource assigning method for a communication control apparatus according to claim 82, characterized by further comprising third determining step of determining whether or not there is any free resource that is equivalent to said requested resource if said first determining step determines that request for said resource assignment is to be accepted, and in that if said third determining step determines that there is no such a free resource, said second determining step determines whether or not said resource amount can be reduced.

89. The resource assigning method for a communication control apparatus according to claim 82, characterized in that if said second determining step determines that said resource amount cannot be reduced, said communication between the terminals is continued by using a common resource competitively used by a plurality of communications.

90. The resource assigning method for a communication control apparatus according to claim 82, characterized in that said communication control apparatus is applied to a communication system comprising a plurality of base stations and at least one mobile station communicating with said base stations via radio channels, and said measuring step measures said current traffic by counting the number of radio channels currently used in saidbase stations.

91. The resource assigning method for a communication control apparatus according to claim 82, characterized in that said communication control apparatus is applied to a communication system comprising a plurality of base stations and at least one mobile station communicating with said base stations by spreading an information data modulating signal using a spreading code, and said measuring step measures said current traffic by measuring interference power of signals received by said base stations.

92. The resource assigning method for a communication control apparatus according to claim 82, characterized in that said communication control apparatus is applied to a communication system comprising a plurality of base stations and at least one mobile station communicating with said base stations by spreading an information data modulating signal using a spreading code, and said measuring step measures said current traffic by measuring total power transmitted by said base stations.

93. The resource assigning method for a communication control apparatus according to claim 86, characterized in that if said second determining step determines that said resource amount cannot be reduced, said communication between the terminals is continued by using a common resource competitively used by a plurality of communications.

94. The resource assigning method for a communication control apparatus according to claim 88, characterized in that if said second determining step determines that said resource amount cannot be reduced, said communication between the terminals is continued by using a common resource competitively used by a plurality of communications.

95. The resource assigning method for a communication control apparatus according to claim 88, characterized in that said communication control apparatus is applied to a communication system comprising a plurality of base stations and at least one mobile station communicating with said base stations via radio channels, and said measuring step measures said current traffic by counting the number of radio channels currently used in said base stations.

96. The resource assigning method for a communication control apparatus according to claim 88, characterized in that said communication control apparatus is applied to a communication system comprising a plurality of base stations and at least one mobile station communicating with said base stations via radio channels, and said measuring step measures said current traffic by counting the number of radio channels currently used in said base stations.

97. The resource assigning method for a communication control apparatus according to claim 88, characterized in that said communication control apparatus is applied to a communication system comprising a plurality of base stations and at least one mobile station communicating with said base stations by spreading an information data modulating signal using a spreading code, and said measuring step measures said current traffic by measuring total power transmitted by said base stations.

98. The resource assigning method for a communication control apparatus according to claim 94, characterized in that said communication control apparatus is applied to a communication system comprising a plurality of base stations and at least one mobile station communicating with said base stations via radio channels, and said measuring step measures said current traffic by counting the number of radio channels currently used in said base stations.

99. The resource assigning method for a communication control apparatus according to claim 94, characterized in that said communication control apparatus is applied to a communication system comprising a plurality of base stations and at least one mobile station communicating with said base stations via radio channels, and said measuring step measures said current traffic by counting the number of radio channels currently used in said base stations.

100. The resource assigning method for a communication control apparatus according to claim 94, characterized in that said communication control apparatus is applied to a communication system comprising a plurality of base stations and at least one mobile station communicating with said base stations by spreading an information data modulating signal using a spreading code, and said measuring step measures said current traffic by measuring total power transmitted by said base stations.

* * * * *

UNITED STATES PATENT AND TRADEMARK OFFICE
CERTIFICATE OF CORRECTION

PATENT NO. : 6,947,751 B2  
APPLICATION NO. : 09/968732  
DATED : September 20, 2005  
INVENTOR(S) : Ishikawa et al.

It is certified that error appears in the above-identified patent and that said Letters Patent is hereby corrected as shown below:

Title Page  
Item 73, Assignee, change "DeCoMo" to --DoCoMo--

Column 3  
Line 16, change "bases" to --basis--  
Line 30, change "aspect" to --aspects--

Column 4  
Line 66, change "aspect" to --aspects--

Column 5  
Line 25, change "aspect" to --aspects--  
Line 32, remove "any of"  
Line 63, change "sources" to --resources--

Column 6  
Line 44, change "are" to --is--

Column 7  
Line 29, change "THRM+1" to --$THR_{M+1}$--  
Lines 59-60, change "is accepting the resource request" to --of accepting the resource is requested--

Column 13  
Line 20, remove "not"

Column 16  
Line 2, change "die" to --the--  
Line 9, change "die" to --the--

UNITED STATES PATENT AND TRADEMARK OFFICE
CERTIFICATE OF CORRECTION

PATENT NO. : 6,947,751 B2
APPLICATION NO. : 09/968732
DATED : September 20, 2005
INVENTOR(S) : Ishikawa et al.

It is certified that error appears in the above-identified patent and that said Letters Patent is hereby corrected as shown below:

Column 20
Line 54, change "saidbase" to --said base--

Signed and Sealed this

Seventeenth Day of July, 2007

JON W. DUDAS
*Director of the United States Patent and Trademark Office*